US012645914B2

(12) United States Patent
Khodamoradi et al.

(10) Patent No.: US 12,645,914 B2
(45) Date of Patent: Jun. 2, 2026

(54) INSTRUCTION PRUNING FOR NEURAL NETWORKS

(71) Applicant: Xilinx, Inc., San Jose, CA (US)

(72) Inventors: Alireza Khodamoradi, Lafayette, CO (US); Kristof Denolf, Longmont, CO (US)

(73) Assignee: XILINX, INC., San Jose, CA (US)

( * ) Notice: Subject to any disclaimer, the term of this patent is extended or adjusted under 35 U.S.C. 154(b) by 778 days.

(21) Appl. No.: 18/072,012

(22) Filed: Nov. 30, 2022

(65) Prior Publication Data

US 2024/0176981 A1 May 30, 2024

(51) Int. Cl.
*G06N 3/04* (2023.01)

(52) U.S. Cl.
CPC ...................................... *G06N 3/04* (2013.01)

(58) Field of Classification Search
CPC .......... G06N 3/04; G06N 3/063; G06N 3/045; G06N 3/082
See application file for complete search history.

(56) References Cited

U.S. PATENT DOCUMENTS 11,928,468 B2 * 3/2024 Balasubramanian ........................ G06F 9/4881

OTHER PUBLICATIONS

Niu, Wei, et al. "Patdnn: Achieving real-time dnn execution on mobile devices with pattern-based weight pruning." Proceedings of the Twenty-Fifth International Conference on Architectural Support for Programming Languages and Operating Systems. 2020. (Year: 2020).*

Kim, Taeho, et al. "CPrune: Compiler-informed model pruning for efficient target-aware DNN execution." European Conference on Computer Vision. Cham: Springer Nature Switzerland, 2022. (Year: 2022).*

Lee, Kwangbae, et al. "Flexible group-level pruning of deep neural networks for on-device machine learning." 2020 Design, Automation & Test in Europe Conference & Exhibition (DATE). IEEE, 2020. (Year: 2020).*

Guan, Hui, Xipeng Shen, and Seung-Hwan Lim. "Wootz: A compiler-based framework for fast cnn pruning via composability." Proceedings of the 40th ACM SIGPLAN Conference on Programming Language Design and Implementation. 2019. (Year: 2019).*

Vemparala, Manoj-Rohit, et al. "Hw-flow: A multi-abstraction level hw-cnn codesign pruning methodology." Leibniz Transactions on Embedded Systems 8.1 (2022): 03-1. (Year: 2022).*

(Continued)

*Primary Examiner* — Miranda M Huang
*Assistant Examiner* — Sidney Vincent Bostwick
(74) *Attorney, Agent, or Firm* — Patterson + Sheridan, LLP

(57) ABSTRACT

In pruning weights from a neural network (NN), a design tool selects a dt-ds pair from a plurality of dt-ds pairs supported by a target device. Each dt-ds pair specifies a data type, dt, and an associated circuit structure, ds, that is configurable to compute d×s operations in parallel on a set of input activations and a matrix of weights of the data type, d is a number of rows in a sub-matrix of the matrix of weights, s is a number of columns in the sub-matrix, and d×s≥1. The design tool selects as pruned weights, one or more subsets of the weights, based at least on each subset of the one or more subsets including d×s weights in the matrix of weights of the layer. If performance of the pruned NN model is satisfactory, the NN is compiled into an execution graph and configuration data.

20 Claims, 9 Drawing Sheets

(56) References Cited

OTHER PUBLICATIONS

Li, Yanyu, et al. "A Compiler-aware Framework of Network Pruning Search Achieving Beyond Real-Time Mobile Acceleration." (Year: 2021).*

Song Han, et al., "Deep Compression: Compressing Deep Neural Networks With Pruning, Trained Quantization and Huffman Coding", arXiv:1510.00149v5 [cs.CV] Feb. 15, 2016, Published as a conference paper at ICLR 2016.

Song Han, et al., "Learning both Weights and Connections for Efficient Neural Networks", arXiv:1506.02626v3 [cs.NE] Oct. 30, 2015.

Wang Lei, et al., "Compressing Deep Convolutional Networks Using K-means Based on Weights Distribution", IIP'17, Jul. 17-18, 2017, Bangkok, Thailand, (c) 2017 Association for Computing Machinery.

Muthukrishnan R, et al., "Lasso: A Feature Selection Technique In Predictive Modeling For Machine Learning", 2016 IEEE International Conference on Advances in Computer Applications (ICACA), © 2016 IEEE.

Jiecao Yu, et al., "Scalpel: Customizing DNN Pruning to the Underlying Hardware Parallelism", ISCA '17, Jun. 24-28, 2017, Toronto, ON, Canada.

Zehao Huang, et al., "Data-Driven Sparse Structure Selection for Deep Neural Networks", arXiv:1707.01213v3 [cs.CV] Sep. 5, 2018.

Wei Wen, et al., "Learning Structured Sparsity in Deep Neural Networks", arXiv:1608.03665v4 [cs.NE] Oct. 18, 2016.

Zhekai Zhang, et al., "SpArch: Efficient Architecture for Sparse Matrix Multiplication", arXiv:2002.08947v1 [cs.AR] Feb. 20, 2020, The 26th IEEE International Symposium on High-Performance Computer Architecture (HPCA 2020).

Jinjie Zhang, et al., "Post-Training Quantization for Neural Networks With Provable Guarantees", arXiv:2201.11113v2 [cs.LG] Jul. 22, 2022.

* cited by examiner $$O_0 =$$
$$I_0 * W_{0,0} +$$
$$I_1 * W_{1,0} +$$
$$I_2 * W_{2,0} +$$
$$I_3 * W_{3,0} +$$
$$I_4 * W_{4,0} +$$
$$I_5 * W_{5,0} +$$
$$I_6 * W_{6,0} +$$
$$I_7 * W_{7,0} +$$
$$I_8 * W_{8,0} +$$
$$\ldots +$$
$$I_{15} * W_{15,0} +$$
$$I_{16} * W_{16,0} +$$
$$\ldots +$$
$$I_{23} * W_{23,0} +$$
$$\ldots +$$
$$I_{1023} * W_{1023,0}$$

$$O_{4095} =$$
$$I_0 * W_{0,4095} +$$
$$I_1 * W_{1,4095} +$$
$$I_2 * W_{2,4095} +$$
$$I_3 * W_{3,4095} +$$
$$I_4 * W_{4,4095} +$$
$$I_5 * W_{5,4095} +$$
$$I_6 * W_{6,4095} +$$
$$I_7 * W_{7,4095} +$$
$$I_8 * W_{8,4095} +$$
$$\ldots +$$
$$I_{1023} * W_{1023,4095}$$

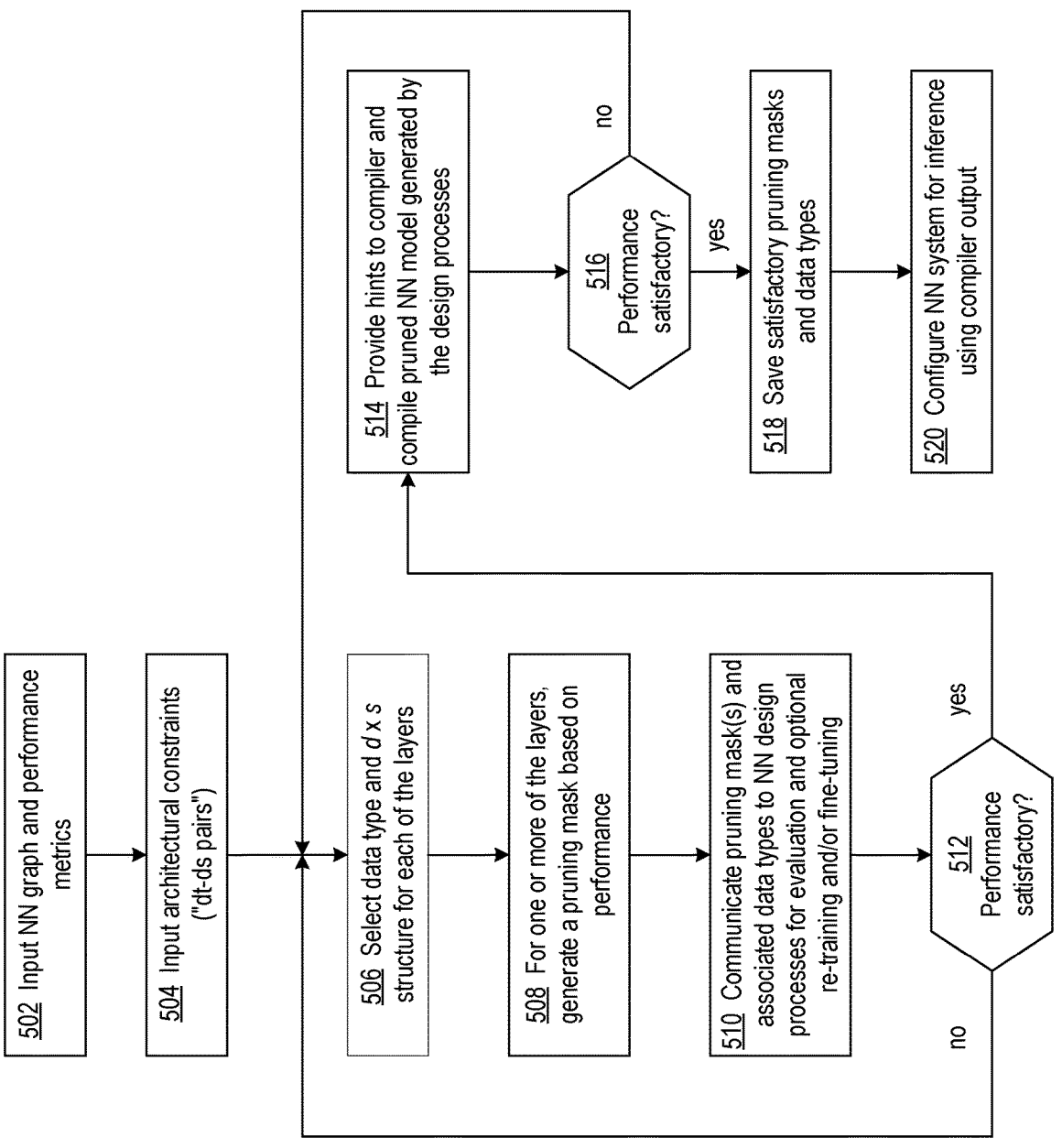

502 Input NN graph and performance metrics

504 Input architectural constraints ("dt-ds pairs")

506 Select data type and *d* x *s* structure for each of the layers

508 For one or more of the layers, generate a pruning mask based on performance

510 Communicate pruning mask(s) and associated data types to NN design processes for evaluation and optional re-training and/or fine-tuning 512 Performance satisfactory?

no yes

514 Provide hints to compiler and compile pruned NN model generated by the design processes 516 Performance satisfactory?

no yes

518 Save satisfactory pruning masks and data types

520 Configure NN system for inference using compiler output

FIG. 7

INSTRUCTION PRUNING FOR NEURAL NETWORKS

TECHNICAL FIELD

The disclosure generally relates to pruning of instructions in neural networks.

BACKGROUND

Neural networks (NN) in many applications have grown to include such a large number of parameters that implementing the neural network in a hardware accelerator has become challenging. Large neural networks are often pruned in order to reduce the computational requirements, improve throughput, and reduce hardware costs.

The parameters of a neural network can include many large matrices of weights that are applied in the many layers of the neural network. Most neural network pruners use a metric to identify and prune unimportant weights, and after pruning the neural network can be re-trained or fine-tuned. Some pruners find hardware-friendly structures.

Though pruning can improve the throughput of a neural network, accuracy may be lost if the pruning is too aggressive. Achieving desired levels of throughput and accuracy in the implementations of large neural networks can be challenging given the sizes of the neural networks and the complexity of targeted hardware accelerators.

SUMMARY

A disclosed method includes selecting by a design tool, for a layer of a plurality of layers of a neural network, NN, model, a current dt-ds pair from a plurality of different dt-ds pairs supported by a target device. Each dt-ds pair specifies a data type, dt, and an associated circuit structure, ds, that is configurable to compute d×s operations in parallel on a set of input activations and a matrix of weights of the data type, d is a number of rows in a sub-matrix of the matrix of weights, s is a number of columns in the sub-matrix, and d×s≥1. The method includes selecting as pruned weights of the layer by the design tool, one or more subsets of the weights, based at least on each subset of the one or more subsets including d×s weights in the matrix of weights of the layer. The method includes evaluating performance, by the design tool, of a pruned version of the NN model based on the data type of the current dt-ds pair of the layer and a pruned weight matrix that is the matrix of weights of the layer pruned according to the pruned weights of the layer. The method includes compiling, in response to the performance satisfying a threshold, the pruned version of the NN model by the design tool into an execution graph and configuration data for implementing, on the target device, the circuit structure of the current dt-ds pair of the layer.

A disclosed system includes an arrangement of one or more processors and a computer storage arrangement. The computer storage arrangement is configured with program code that when executed by the one or more processors causes the one or more processors to perform operations including selecting for a layer of a plurality of layers of a neural network, NN, model, a current dt-ds pair from a plurality of different dt-ds pairs supported by a target device. Each dt-ds pair specifies a data type, dt, and an associated circuit structure, ds, that is configurable to compute d×s operations in parallel on a set of input activations and a matrix of weights of the data type, d is a number of rows in a sub-matrix of the matrix of weights, s is a number of columns in the sub-matrix, and d×s≥1. The operations include selecting as pruned weights of the layer, one or more subsets of the weights, based at least on each subset of the one or more subsets including d×s weights in the matrix of weights of the layer. The operations include evaluating performance of a pruned version the NN model based on the data type of the current dt-ds pair of the layer and a pruned weight matrix that is the matrix of weights of the layer pruned according to the pruned weights of the layer. The operations include compiling, in response to the performance satisfying a threshold, the pruned version of the NN model into an execution graph and configuration data for implementing, on the target device, the circuit structure of the current dt-ds pair of the layer.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which:

FIG. 7 shows a flowchart of a process that involves pruning a neural network by evaluating pruning masks based on alternative pairs of data types and circuit structures supported by a target hardware accelerator;

DETAILED DESCRIPTION

Figure 1:
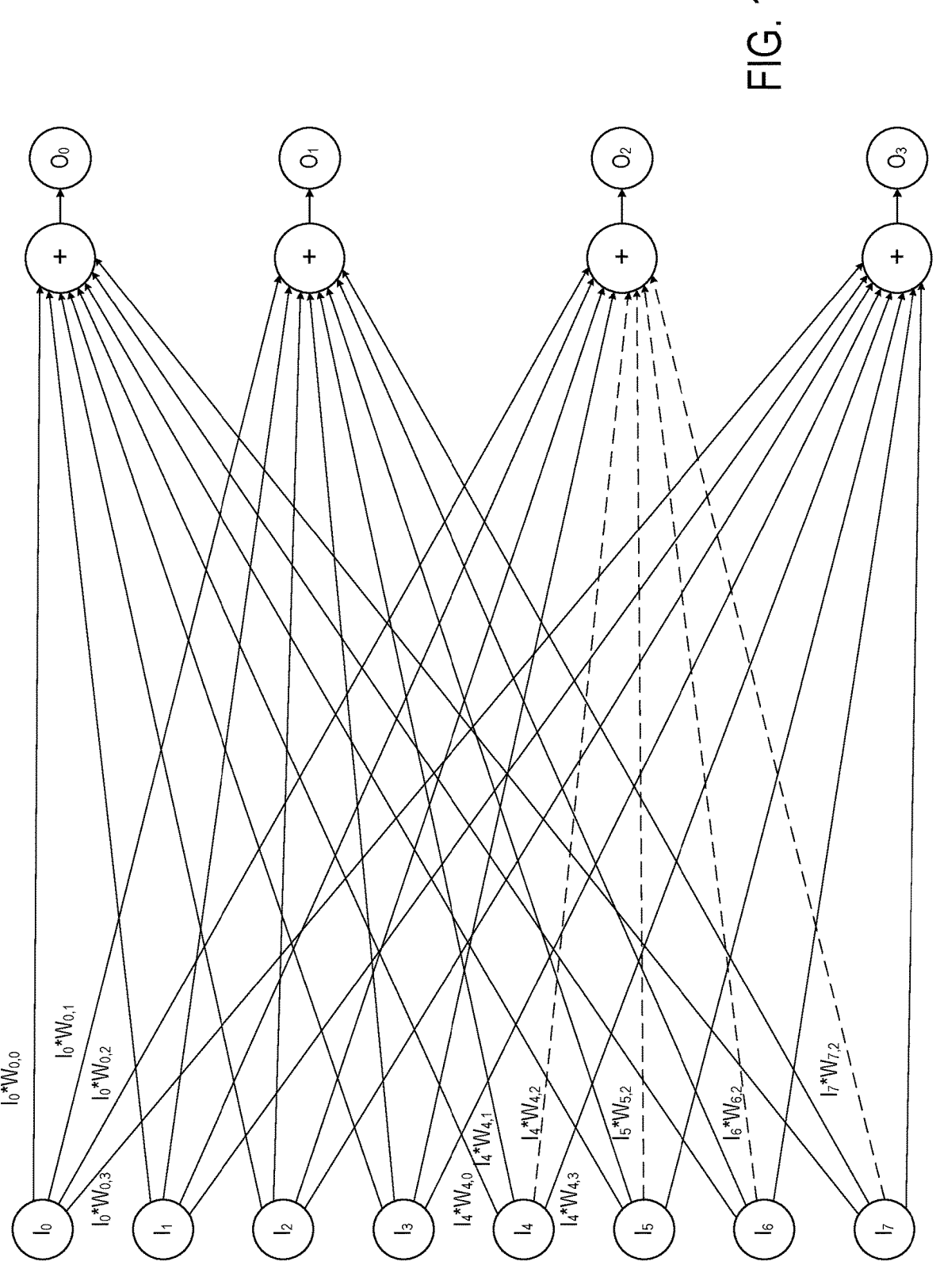
FIG. 1 shows an example of a fully connected graph of a neural network and pruning of selected weights.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems prune neural networks based on the data types of weights and for specific hardware platforms. In addition, the pruner provides hints to the compiler, and compiler results are fed back to the pruner and factored into the pruning process ("compiler-in-the-loop"). For example, the methods and systems improve compression of neural network models for processing technologies in SIMD (single instruction multiple data) class architectures by generating pruning patterns that are dependent on the architecture of the target hardware and on the data type of the parameter. With compiler-in-the-loop, a pruner can respond to compiler results by adjusting pruning patterns and provide hints to the compiler to optimize the hardware implementation and achieve a desired level of accuracy.

The disclosed pruning approaches select pruning patterns based on configuration options of the target hardware architecture for performing arithmetic operations in parallel on operands of potentially different data types (because one operand could accept multiple data types), and on estimated levels of throughput and accuracy of the pruned network. In addition, the pruning approaches can adjust the pruning in response to compiler results. According to one approach, a target hardware accelerator (or "target device") has multiple circuits that can be programmed to perform desired arithmetic operations in parallel. For example, each programmable circuit can be programmed to perform a multiply-and-accumulate function, and an array of the programmable circuits can perform multiply-and-accumulate functions in parallel.

The programmable circuits of the target device can be configured to implement different "circuit structures." Each circuit structure includes multiple ones of the programmable circuits configured to perform a number of arithmetic operations in parallel based on the data type of the operands. Examples of different data types include int4, int8, fp32 etc. Examples of different configurations for the int4 data type include arrays of 64×8, 32×16, 16×32, and 8×64 programmable circuits. Examples of different configurations for the int8 data type includes arrays of 16×8 and 8×16 programmable circuits. An example of a configuration for the fp32 data type is an array of 4×4 programmable circuits.

For ease of reference, each combination of a data type and circuit structure can be referred to as a "dt-ds pair." Each dt-ds pair specifies a data type ("dt") and a circuit structure ("ds"). The circuit structure, ds, of a dt-ds pair is configurable to compute d×s arithmetic operations in parallel on operands (i.e., input activations and weights) of the associated data type(s), dt, where d is the number of rows and s is the number columns in an array of suitably configured programmable circuits. Note that an arithmetic operation can involve operands of different data types, such as one operand being int4 and the other operand being int8. The combination of int4 and int8 can be considered as one data type in the context of dt-ds pairs.

For each layer of one or more layers of a neural network, the pruner logic of a neural network design tool selects a dt-ds pair from the different dt-ds pairs supported by the target device based in part on the data type of the operands. For example, in an initial iteration the pruner logic can select a dt-ds pair having the initial data type. Alternatively, the pruner logic can select a dt-ds pair having a data type that would provide less accuracy than the accuracy provided by the initial data type specified by the neural network model (e.g., int4 versus int8) to support a greater level of parallelism (e.g., int4, 32×16 versus int8, 16×8).

The pruner logic selects one or more groups of weights to prune from a layer such that each group is a d×s sub-matrix of a weight matrix. Notably, each group of d×s weights selected for pruning has the same dimensions as the d×s array of programmable circuits of the selected dt-ds pair. The design tool evaluates performance of the neural network model using, in each of the one or more layers that was pruned, the pruned weight matrix and the data type of the selected dt-ds pair.

In response to the estimated performance not satisfying a performance threshold, the pruner logic can select an alternative dt-ds pair for evaluation. In response to satisfaction of the performance threshold, the pruner logic can communicate to the compiler of the design tool the dt-ds pair(s) selected for the layer(s), and hints to aid in optimizing data movement between different memory levels. The hints could be for load or store or data movement between different memory levels or arithmetic intensity. By changing the pruning granularity and percentage, one could fit the parameters (weights) required for one core in L1 cache instead of multiple partial loads from L2 cache, and a similar benefit could be achieved in L2 and L3 caches. In another example, by pruning the weights for some activations, the loading of the pruned activations to target cores could be skipped. The disclosed approaches provide a large set of potential pruning options that could be used to prune a neural network model to reduce data movement and/or compute time while maintaining a desired level of accuracy.

The compiler generates an execution graph and configuration data from the pruned neural network model according to the dt-ds pair(s) communicated by the pruner logic. The compiler can make results of the compilation available to the pruner logic, and if the compiler is unable to schedule the execution graph, the pruner can select and evaluate different dt-ds pairs in search of a pruning pattern that satisfies performance requirements.

The disclosed methods and systems are described by way of examples involving multiply-and-accumulate functions performed on an input vector and a weight matrix. However, it will be appreciated that the pruning approaches described herein can be applied to functions having other arithmetic operations, such as simple addition or multiplication.

FIG. 1 shows an example of a fully connected graph of a neural network and pruning of selected weights. In a fully connected layer, the neuron applies a linear transformation to the input vector through a weights matrix. The input vector has elements $I_0, I_1, I_2, \ldots, I_7$, and the weights matrix is a 4×8 element matrix. The output vector is a dot product of the weigh matrix and the input vector.

According to the example, weights $W_{4,2}, W_{5,2}, W_{6,2}$, and $W_{7,2}$, can be pruned, as represented by the dashed lines. Accordingly, 4 multiply- and accumulate operations can be eliminated from the computation, and storage is not required for the 4 weights. For large weight matrices that have been pruned, the reduction in storage requirements and computation can be significant.

Figure 2:
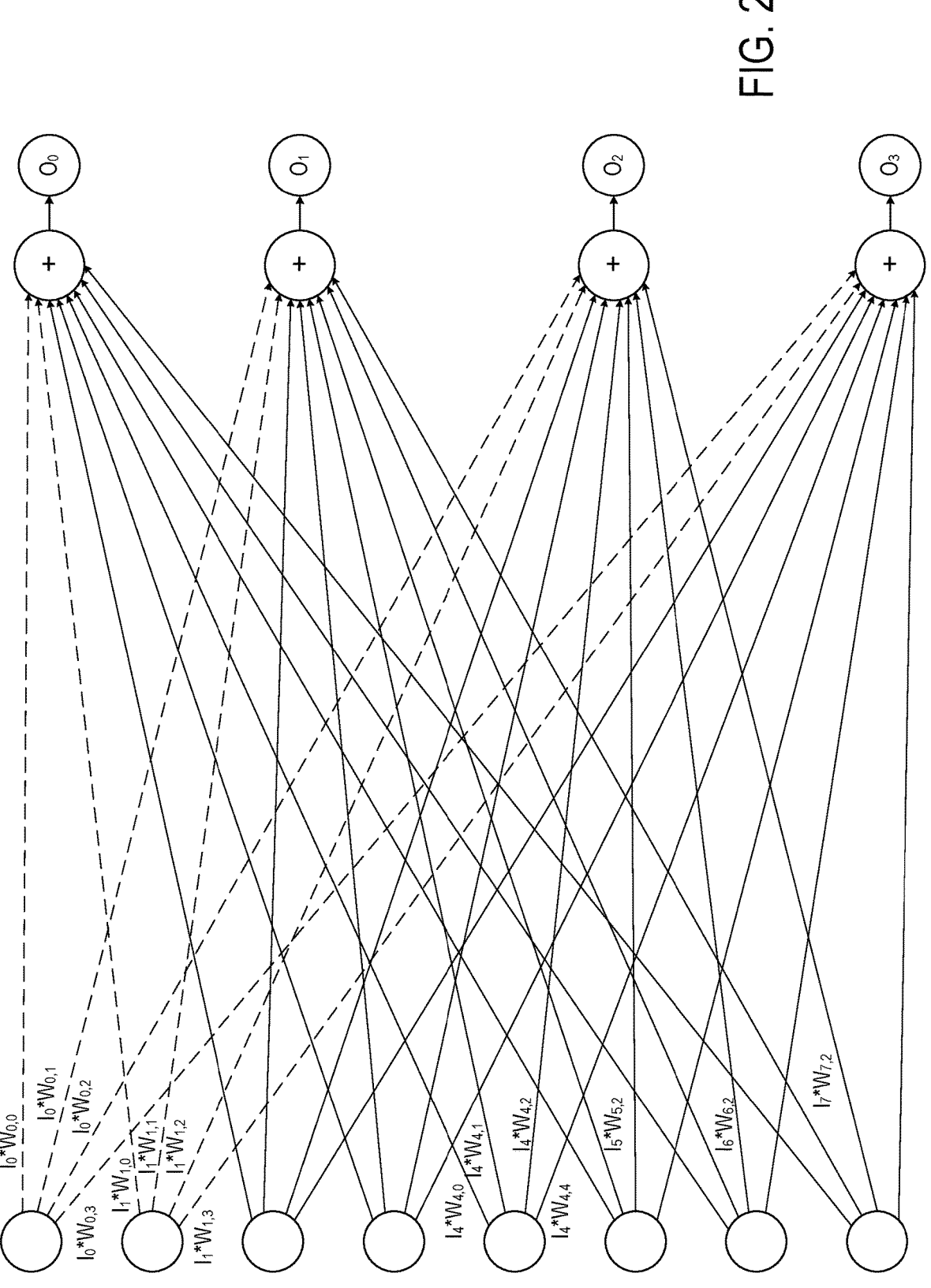
FIG. 2 shows an example of a fully connected graph of a neural network and pruning of selected weights and elements of the input vector (or "input activations")

FIG. 2 shows an example of a fully connected graph of a neural network and pruning of selected weights and elements of the input vector (or "input activations"). According to the example, weights $W_{0,0}, W_{0,1}, W_{0,2}, W_{0,3}, W_{1,1}, W_{1,1}, W_{1,2}$, and $W_{1,3}$ can be pruned, which also eliminates input activations $I_0$ and $I_1$.

Figure 3:
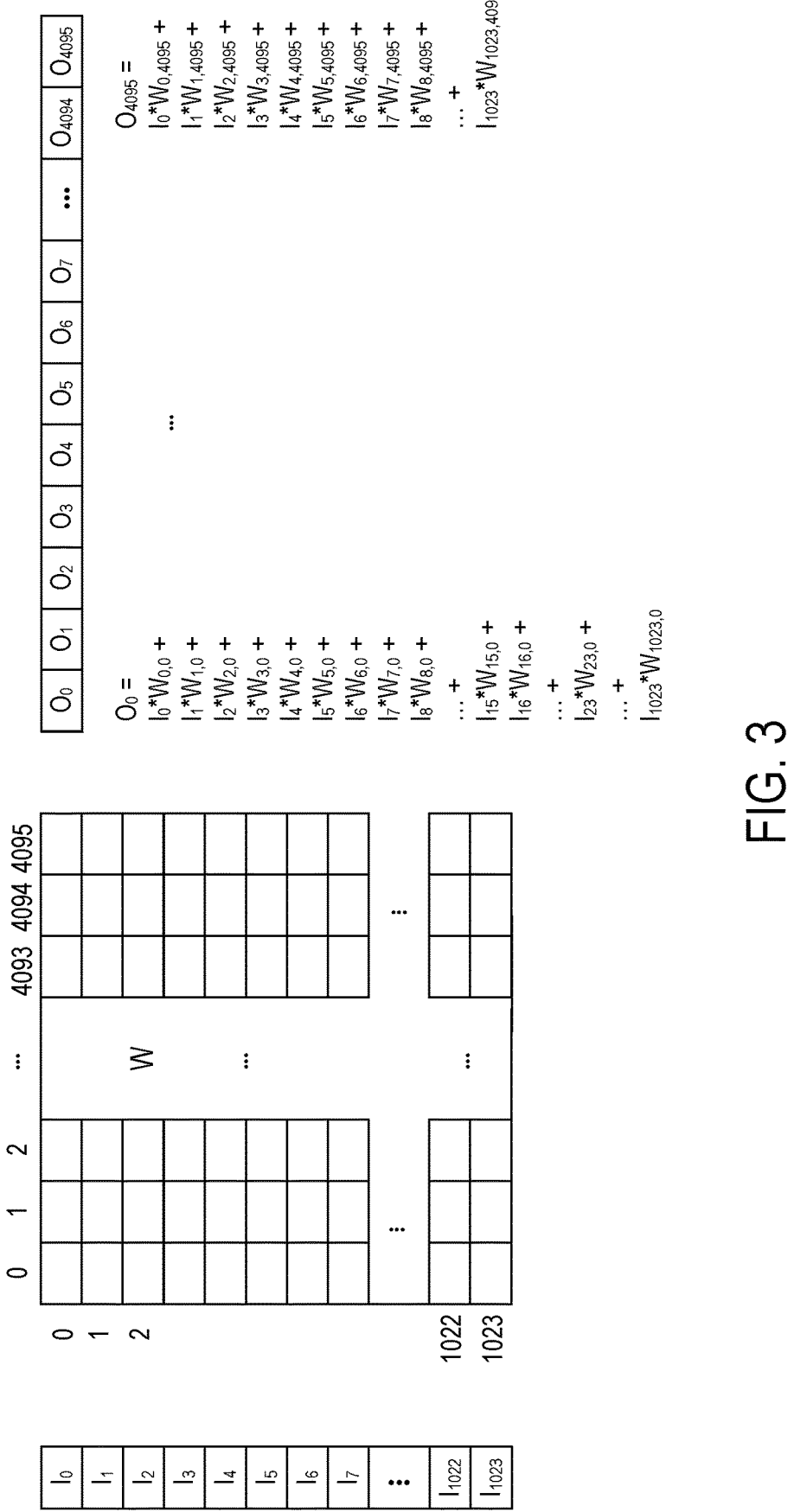
FIG. 3 shows an example of a large 1024×4096 weight matrix, a 1024-element input vector, and an output vector generated from a dot product of the weight matrix and input vector.

FIG. 3 shows an example of a large 1024×4096 weight matrix, a 1024-element input vector, and an output vector generated from a dot product of the weight matrix and input vector.

Figure 4:
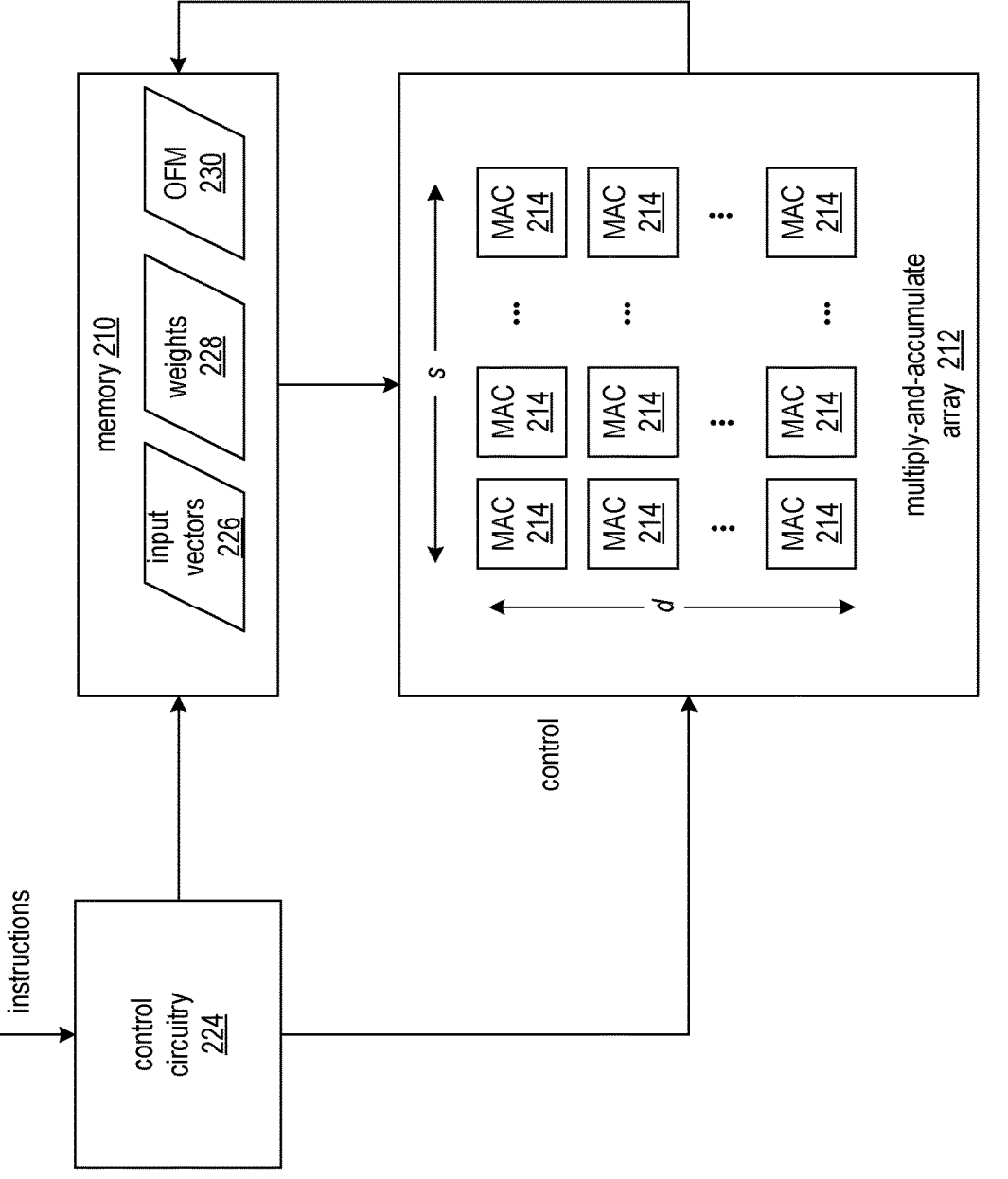
FIG. 4 shows an example of a hardware accelerator that includes an array of programmable circuits that can be configured to perform d×s multiply-and-accumulate operations (or only multiplication, only addition, or other arithmetic or logic operations) in parallel on input activations of an input vector and weights from a weight matrix.

FIG. 4 shows an example of a hardware accelerator that includes an array of programmable circuits that can be configured to perform d×s multiply-and-accumulate operations (or only multiplication, only addition, or other arithmetic or logic operations) in parallel on input activations of an input vector and weights from a weight matrix. Note that the MAC circuits are programmable and can support different dimensions of d and s according to the dt-ds pair selected by the pruning logic.

The hardware accelerator has a multiply-and-accumulate array 212 of MAC circuits 214. Each instance of the MAC circuit has circuitry that is configurable to multiply two input operands and accumulate the product with another input operand. The operands for multiplication can be provided as inputs from the memory 210, and the input operand for accumulation can be provided as an initial value input from the memory or as a partially accumulated value from an adjacent MAC circuit in the array.

The hardware accelerator has control circuitry 224 that inputs instructions and controls the MAC array 212, and memory 210 in response to codes in the instructions. In an exemplary application, the sequence of instructions can direct processing of input vectors 226 with weights 228. The results can be stored as one or more output vectors 230 in the memory.

According to an example, a "MAC instruction" includes the group of d×s MAC operations that can be performed in parallel by a d×s array of processors on an input vector and weight matrix. Example 1 shows a MAC instruction operating on an input vector of length d and a d×s weight matrix.

$$O_0=I_0*W_{0,0}+I_1*W_{1,0}, \ldots ,I_d*W_{d,0}$$

$$O_1=I_0*W_{0,1}+I_1*W_{1,1}, \ldots ,I_d*W_{d,1}$$

$$O_2=I_0*W_{0,2}+I_1*W_{1,2}, \ldots ,I_d*W_{d,2}$$

$$\ldots$$

$$O_s=I_0*W_{0,s}+I_1*W_{1,s}, \ldots ,I_d*W_{d,s}$$

Example 1

As described above, some hardware accelerators support different sizes of d and s based on the data type of the operands. The disclosed methods and systems can evaluate the suitability of different pruning patterns based on the different data types and array sizes ("dt-ds pairs") supported by the accelerator.

Figure 5:
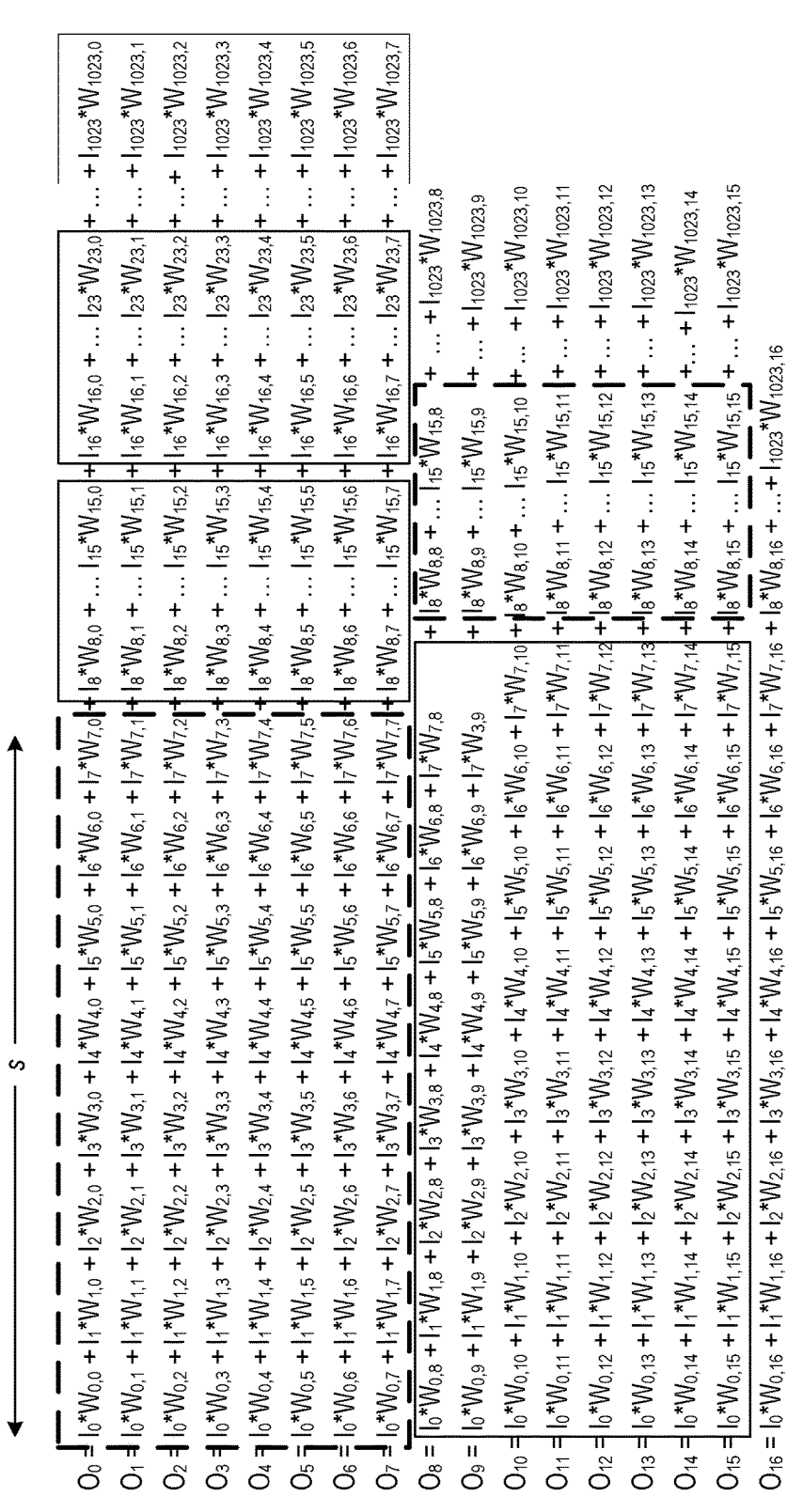
FIG. 5 shows the example of FIG. 4 in which the MAC operations associated with computation of the dot product are grouped according to an exemplary d×s size.

FIG. 5 shows the example of FIG. 3 in which the MAC operations associated with computation of the dot product are grouped according to an exemplary d×s size. In the example, d=8 and s=8, though the methods and systems can evaluate pruning patterns based on different data types and sizes supported by the accelerator.

Each of the blocks in FIG. 5 corresponds to a MAC instruction, and the pruning logic can effectively prune a MAC instruction by selecting and pruning a d×s group of weights from the weight matrix. The size of the d×s group of weights selected for pruning is dependent on the data type and the configuration of the hardware accelerator that can perform the instruction on that data type. The selection by the pruning logic of a particular group of weights for pruning can be based on the levels of significance of the weights in the group.

The dashed blocks in the example of FIG. 5 show two groups of weights to be pruned, which would eliminate the processing of two MAC instructions for computing the dot product of the input vector and the weight matrix.

If the pruned neural network fails to satisfy performance requirements, such as one or more of latency, throughput, or accuracy, or the compiler cannot schedule the instructions, the pruning logic can determine a different set of weights to prune. The pruning logic can take different actions depending on whether the pruned neural network satisfied or failed to satisfy each of throughput and accuracy or the compiler failed in scheduling. The options can include selecting a different dt-ds pair that provides greater or lesser granularity, selecting a different dt-ds pair that provides greater or lesser accuracy, and/or selecting more or fewer weights to prune by changing the level of significance that controls the selection. The granularity refers to the size of d×s. For example, a 4×4 size has a finer granularity than an 8×8 size, and the 8×8 size has a coarser granularity than the 4×4 size. A 4×2 size has the same granularity as a 2×4 size. A data type that uses a greater number of bits can generally provide a greater level of accuracy than a data type that uses lesser number of bits.

Figure 6:
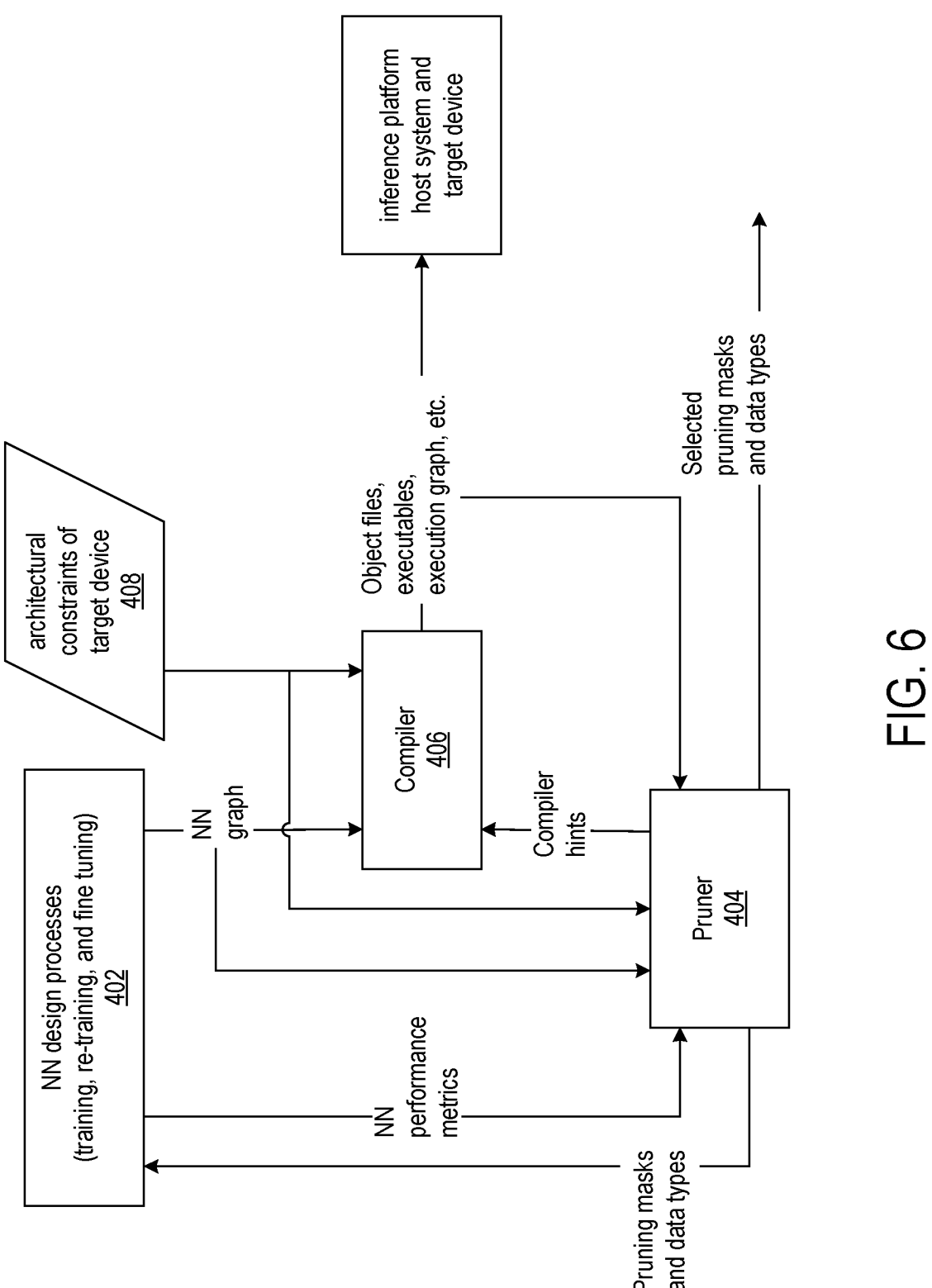
FIG. 6 shows an exemplary data flow for pruning a neural network using the disclosed instruction pruner.

FIG. 6 shows an exemplary data flow for pruning a neural network using the disclosed instruction pruner. The functional and logic components include neural network design processes 402, a pruner 404, and a compiler 406. The neural network design processes include tools for specifying, evaluating, training, retraining, and fine tuning a neural network application. The pruner includes logic for pruning weights from layers of the neural network, and the compiler generates configuration data to implement the neural network.

The pruner 404 retrieves the graph specification of the neural network model and performance metrics of the weights, such as magnitudes, accuracy levels, and sensitivity levels, from the neural network design processes 402. The pruner also retrieves the architectural constraints 408 of the target device. The architectural constraints include a list of all supported dt-ds pairs. For example, the list of supported dt-ds pairs could be {[float32, (4,4)], [half, (8,8)], [int8, (16,8)], [int8, (8,16)], [int4, (64,8)], [int4, (32,16)], [int4, (16,32)], [int4, (8,64)]} ("half" is half floating point, e.g., 16-bit floating point).

The pruner 404 can generate different pruning masks based on different dt-ds pairs and have the neural network design processes 402 evaluate performance of the neural network pruned according to the different pruning masks and associated data types. A pruning mask specifies the groups/subsets of weights to be pruned, and each group/subset is a d×s sub-matrix of the overall weight matrix. The data types are suggestions to the design processes to evaluate the achievable accuracy (output quality). Generally, a model is originally designed with wider data types (a greater number of bits per parameter) and the pruner will suggest narrower data types (a lesser number of bits) and pruning masks for minimizing the computation cost and maximizing the performance.

In response to the performance metrics, as communicated by the neural network design processes 402 to the pruner 404, indicating that the performance is satisfactory, the pruner can provide hits to the compiler 406 for compiling the pruned neural network graph. The hints include the data type and programmable circuit structure from which the pruner generated the pruning mask.

The results of the compilation, including warning and error messages and configuration data, can be accessed by the pruner. If the compilation results are unsatisfactory, the pruner can employ a different pruning strategy and generate different pruning masks and data types to apply to the neural network model. For example, if the compiler fails to schedule instructions of the pruned neural network, the pruner can adjust the pruning granularity. In another example, in response to the number cache loads and stores exceeding a threshold, the pruner can change the pruning percentage or granularity. An optimal pruning mask and paired data type are those identified by the pruner that provide the least reduction in level of accuracy, the least latency, and the greatest throughput. The levels of throughput and latency can be balanced against power efficiency according to application requirements.

FIG. 7 shows a flowchart of a process that involves pruning a neural network by evaluating pruning masks based on alternative pairs of data types and circuit structures supported by a target hardware accelerator.

At block 502, the pruner inputs the graph that describes a neural network along with initial performance metrics that are estimated based on data types of the parameters. The performance metrics can include latency, throughput, and accuracy, for example.

At block 504, the pruner inputs a specification of the architectural constraints of the target device. The architectural constraints specify dt-ds pairs, each of which specifies a data type and an associated circuit structure that can compute d×s operations in parallel on an input vector and a matrix of weights.

At block 506, the pruner selects a dt-ds pair (i.e., data type and a circuit structure) to be used as a basis pruning. In an initial iteration, the pruner may select a dt-ds pair that has the data type of the initial neural network model. Alternatively, the pruner may select a dt-ds pair that is likely to improve throughput, such as one having a data type that provides a lesser level of accuracy. Notably, the selecting of dt-ds pairs and the associated pruning can be applied to one or more layers of a neural network. Within a layer, a weight matrix can be tiled, and the selection of dt-ds pairs and pruning can be performed on a per-tile basis. Different dt-ds pairs can be selected and sub-matrices of weights having different d×s dimensions can be used in pruning weights within the same layer.

At block 508, the pruner generates a pruning mask based on dt-ds pair and on current levels of the performance metrics relative to desired levels. The pruner can prune a larger number of weights to achieve greater throughput and reduce latency, which could potentially reduce accuracy. Alternatively, the pruner could prune fewer weights to achieve greater accuracy, which would reduce the potential improvement in throughput or latency.

The pruner considers subsets of weights of the matrix for pruning based on the d×s dimensions indicated by the dt-ds pair and the relative importance of the weights. That is, each subset is a group of d×s weights of the matrix, and if the level of importance of the group of d×s weights is less than a threshold, the group can be selected for pruning. Otherwise, the group is not selected for pruning. A metric such as magnitude can be used to indicate the importance of a weight, and the importance of a group of weights can be the mean or median of the magnitudes of the weights in the group. More or fewer groups of weights can be selected for pruning by adjusting the threshold level of importance. Other metrics for selecting groups of weights can include Lp norms and thresholding for sparsity.

The weights selected for pruning can be indicated by the pruner to the design neural network design processes by a "pruning mask." The pruning mask indicates which groups are to be pruned and which groups are not to be pruned from the matrix. At block 510, the pruner communicates the pruning mask(s) and associated data type(s) to the neural network design processes for evaluation. The neural network design processes evaluate performance of the neural network, as pruned according to the pruning mask(s), and communicate estimated performance metrics back to the pruner. In evaluating the performance the neural network design processes can employ known evaluation techniques and in addition retrain and fine-tune the neural network if necessary or desirable.

At block decision bock 512, the pruner determines whether or not the pruned neural network produces satisfactory results based on the performance metrics returned from the design processes. In response to the performance metrics indicating that neither throughput nor accuracy satisfy application thresholds, at block 506 the pruner can adjust the pruning granularity, the number of pruned subsets, and/or the data type to generate a new pruning mask for another iteration.

As one example, if the level of accuracy is less than a threshold, a dt-ds pair having a finer granularity can be selected to construct a pruning mask for another iteration. As another example, if the throughput is less than a threshold, a dt-ds pair having a coarser granularity can be selected. Alternatively, the number of groups of weights selected for pruning can be increased using the same dt-ds pair and relaxing the criteria for selecting groups to be pruned.

For smaller networks the pruner can iterate through the possible and viable dt-ds pairs in search of the pruning mask(s) that provide the desired optimal accuracy and throughput. For larger neural networks, which involve larger search spaces, the pruner can employ an intelligent search algorithm select a pruning mask expected to optimize throughput and accuracy, as well as reduce the search space.

In response to the performance metrics from the design processes indicating that the performance is satisfactory, the pruner proceed to block 514. At block 514, the pruner provides hints to the compiler, and the compiler compiles the pruned neural network. The hints include indications of the circuit structures of the dt-ds pairs that resulted in the effective pruning mask(s).

The compiler generates configuration data from the pruned neural network model for implementing the neural network in a system that includes the target device having a hardware accelerator. In compiling the neural network model, the compiler arranges the data movement, schedules the executions, and groups the weights to load for each instruction. The configuration data can include executable program code as well as data for implementing circuits in programmable logic.

Though the design processes may indicate that the pruned neural network satisfies certain performance criteria, compilation may reveal that the pruned neural network fails to satisfy other criteria. For example, the compiler may fail to successfully schedule operations of the pruned neural network, produce configuration data that exceeds program code or programmable logic thresholds, or indicate excessive loads and stores to processor registers or at different level of memory, such as in multiple cache levels and/or processor-local memory.

At decision block 516, the pruner determines whether or not the compiler produced satisfactory results. In response to the compiler results indicating a failure to produce satisfactory results, the pruner returns to block 506. Failures can include unsuccessfully scheduling operations, producing configuration data that exceeds program code or programmable logic thresholds, or exceeding thresholds of numbers of loads and stores.

At block 506, in response to compilation failures, the pruner can adjust the granularity of the pruning mask. For example, the pruner can select a dt-ds pair having a finer granularity in response to the compiler failing to schedule the operations of the neural network. Alternatively, at block

508 the pruner can maintain the same granularity and select more groups of weights for pruning.

For other compilation failures, the pruner can select dt-ds pairs having a coarser granularity. In response to the compiler results indicating the number of processor register loads and stores exceeds a threshold, or the number of cache loads and stores exceeds a threshold, or executable program code size exceeds a threshold, or the size of configuration data for programmable exceeds a threshold, the pruner can select dt-ds pairs having coarser granularities than pairs selected in a previous iteration. Once pruning masks are generated, the pruning process continues as described above.

At block 518, the pruner saves the pruning masks in response to the compiler producing satisfactory results. At block 520 the target device can be configured using the generated configuration data to implement the neural network.

Figure 8:
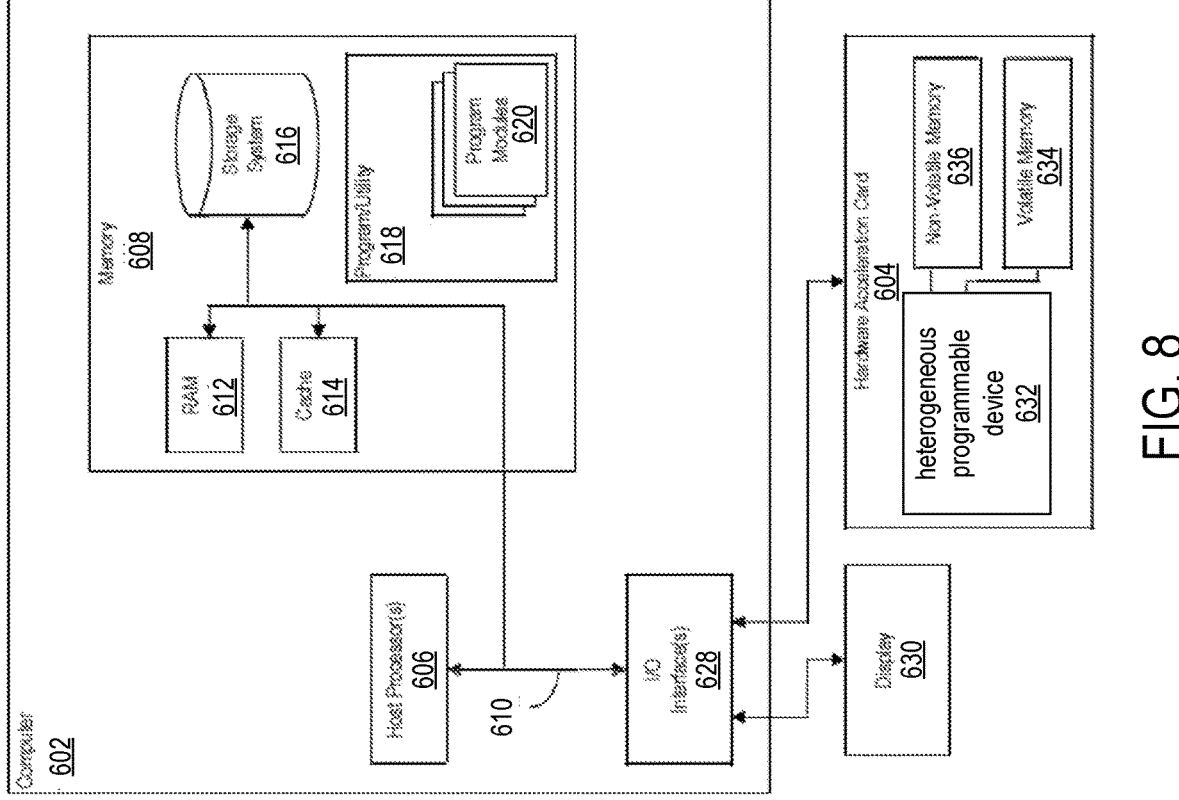
FIG. 8 illustrates an exemplary system that can prune a neural network model and compile the pruned neural network model into an implementation of the neural network.

FIG. 8 illustrates an exemplary system that can prune a neural network model and compile the pruned neural network model into an implementation of the neural network. The exemplary system includes a computer 602 (sometimes referred to herein as a "host" or "host system") for use with the inventive arrangements described within this disclosure. Computer 602 may include, but is not limited to, one or more processors 606 (e.g., central processing units), a memory 608, and a bus 610 that couples various system components including memory 608 to processor(s) 606.

Processor(s) 606 may include any of a variety of processors that are capable of executing program code. Example processor types include, but are not limited to, processors having an x86 type of architecture (IA-32, IA-64, etc.), Power Architecture, ARM processors, and the like.

Bus 610 represents one or more of any of several types of communication bus structures. Example bus structures include a memory bus, a peripheral bus, a graphics bus, and a processor or local bus. The bus structure may be implemented using any of a variety of available bus architectures. By way of example, and not limitation, such bus architectures include Peripheral Component Interconnect (PCI) bus, PCI Express (PCIe) bus, Advanced Microcontroller Bus Architecture (AMBA) Advanced Extensible Interface (AXI) bus, and/or other known buses.

Computer 602 typically includes a variety of computer readable media. Such media may be any available media that is accessible by computer 602 and may include any combination of volatile media, non-volatile media, removable media, and/or non-removable media.

Memory 608 may include computer readable media in the form of volatile memory, such as random-access memory (RAM) 612 and/or cache memory 614. Computer 602 may also include other removable/non-removable, volatile/non-volatile computer system storage media. By way of example, storage system 616 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 610 by one or more data media interfaces. As will be further depicted and described below, memory 608 may include one or more computer program products having a set (e.g., at least one) of program modules (e.g., program code) that are configured to carry out the functions and/or operations described in this disclosure.

For example, program/utility 618, having a set (at least one) of program modules 620 which may include, but are not limited to, an operating system, one or more application programs (e.g., user applications), other program modules, and/or program data, is stored in memory 608. Program modules 620 generally carry out the functions and/or methodologies of a design tool having an instruction pruner as described herein.

In preparing an implementation of a neural network, the program modules can implement functions that prune weights from the neural network according to the approaches disclosed herein. Accordingly, the host computer system 602 executing the program modules is an exemplary implementation of the design processes, pruner logic and compiler as described above.

Program modules 620 may also implement a software stack. The software stack, when executed by computer 602, may implement a runtime environment capable of communicating with hardware acceleration card 604 at runtime. For example, program modules 620 may include a driver or daemon capable of communicating with heterogeneous device 632. Thus, computer 602 may operate as a host that is capable of executing a runtime software system capable of connecting to hardware acceleration card 604.

In another example implementation, computer 602 is used for purposes of developing, e.g., compiling, the user application. Heterogeneous device 632 may include one or more processors therein providing a complete embedded system. In that case, the one or more processors of heterogeneous device 632 may execute the runtime software system such that the one or more processors embedded in heterogeneous device 632 operate as the host system or host processor as the case may be.

Program/utility 618 is executable by processor(s) 606. Program/utility 618 and any data items used, generated, and/or operated upon by processor(s) 606 are functional data structures that impart functionality when employed by processor(s) 606. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 602 may include one or more Input/Output (I/O) interfaces 628 communicatively linked to bus 610. I/O interface(s) 628 allow computer 602 to communicate with external devices, couple to external devices that allow user(s) to interact with computer 602, couple to external devices that allow computer 602 to communicate with other computing devices, and the like. For example, computer 602 may be communicatively linked to a display 630 and to hardware acceleration card 604 through I/O interface(s) 628. Computer 602 may be coupled to other external devices such as a keyboard (not shown) via I/O interface(s) 628. Examples of I/O interfaces 628 may include, but are not limited to, network cards, modems, network adapters, hardware controllers, etc.

In an example implementation, the I/O interface 628 through which computer 602 communicates with hardware acceleration card 604 is a PCIe adapter. Hardware acceleration card 604 may be implemented as a circuit board that couples to computer 602. Hardware acceleration card 604 may, for example, be inserted into a card slot, e.g., an available bus and/or PCIe slot, of computer 602.

Hardware acceleration card 604 includes heterogeneous device 632. Hardware acceleration card 604 also includes volatile memory 634 coupled to heterogeneous device 632 and a non-volatile memory 636 also coupled to heterogeneous device 632. Volatile memory 634 may be implemented as a RAM that is external to heterogeneous device 632, but is still considered a "local memory" of heterogeneous device 632, whereas memory 608, being within computer 602, is not considered local to heterogeneous device 632. In some implementations, volatile memory 634 may include multiple gigabytes of RAM. Non-volatile memory 636 may be implemented as flash memory. Non-volatile memory 636 is also external to heterogeneous device 632 and may be considered local to heterogeneous device 632.

Notably, volatile memory 634 and non-volatile memory 634 are "off-chip memory" relative to memory resources available on the heterogeneous device 632. That is, heterogeneous device 632 can have RAM banks disposed on the same IC die or package as programmable logic and routing resources of the device, and access to the volatile memory 634 and non-volatile memory 636 is provided to logic on the device way of a memory bus protocol, such as AXI DMA or AXI stream.

FIG. 8 is not intended to suggest any limitation as to the scope of use or functionality of the examples described herein. Computer 602 is an example of computer hardware (e.g., a system) that is capable of performing the various operations described within this disclosure relating to implementing user applications and/or runtime interactions with hardware acceleration card 604 and/or heterogeneous device 632. Heterogeneous device 632, for example, may be implemented as a programmable IC.

Computer 602 is only one example implementation of a computer that may be used with a hardware acceleration card. Computer 602 is shown in the form of a computing device, e.g., a computer or server. Computer 602 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

Figure 9:
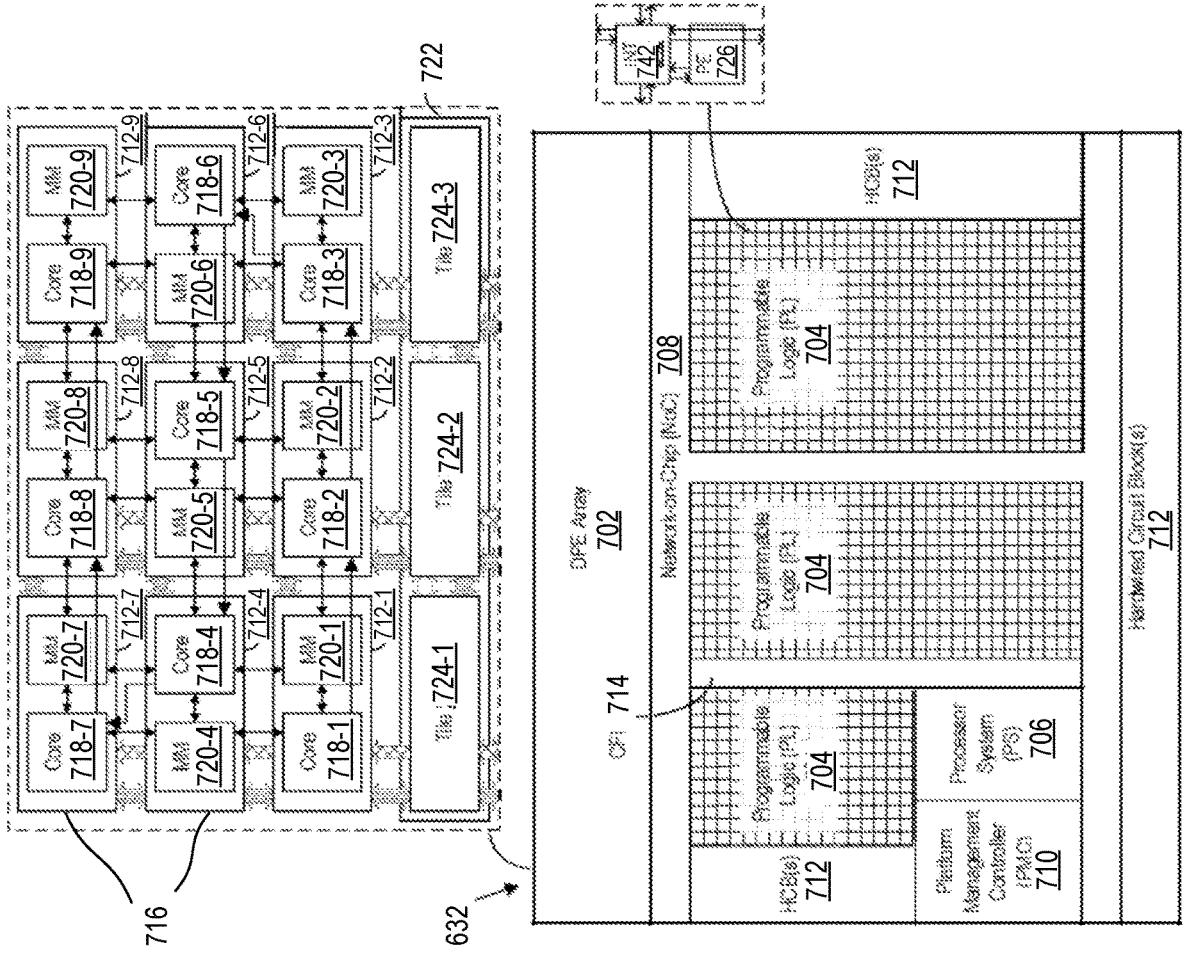
FIG. 9 shows an exemplary heterogeneous device.

FIG. 9 illustrates an exemplary heterogeneous device 632 and can be implemented as a System-on-Chip (SoC) or System-in-Package (SiP). In one example, heterogeneous device 632 can be implemented on a single IC die provided within a single integrated package. In other examples, heterogeneous device 632 may be implemented using a plurality of interconnected dies where the various programmable circuit resources and/or subsystems illustrated in FIG. 9 are implemented across the different interconnected dies.

In the example, heterogeneous device 632 includes a data processing engine (DPE) array 702, programmable logic (PL) 704, a processor system (PS) 706, a Network-on-Chip (NoC) 708, a platform management controller (PMC) 710, and one or more hardwired circuit blocks (HCBs) 712. A configuration frame interface (CFI) 714 is also included. For purposes of discussion, each of DPE array 702, PL 704, PS 706, NoC 708, PMC 710, and each HCB 712 is an example of a subsystem of heterogeneous device 632.

DPE array 702 is implemented as a plurality of interconnected and programmable data processing engines (DPEs) 716. DPEs 716 may be arranged in an array and are hardwired. Each DPE 716 can include one or more cores 718 and a memory module (abbreviated "MM" in FIG. 9) 720. In one aspect, each core 718 is capable of executing program code stored in a core-specific program memory contained within each respective core (not shown). Each core 718 is capable of directly accessing the memory module 720 within the same DPE 716 and the memory module 720 of any other DPE 716 that is adjacent to the core 718 of the DPE 716 in the up, down, left, and right directions. For example, core 718-5 is capable of directly reading and/or writing (e.g., via respective memory interfaces not shown) memory modules 720-5, 720-8, 720-6, and 720-2. Core 718-5 sees each of memory modules 720-5, 720-8, 720-6, and 720-2 as a unified region of memory (e.g., as a part of the local memory accessible to core 718-5). This facilitates data sharing among different DPEs 716 in DPE array 702. In other examples, core 718-5 may be directly connected to memory modules 720 in other DPEs.

The DPEs 716 can be configured in different circuit structures to perform arithmetic operations on different portions of input vectors and different portions of weight matrices as described above. The DPEs are interconnected by programmable DPE interconnect circuitry. The programmable DPE interconnect circuitry may include one or more different and independent networks. For example, the programmable DPE interconnect circuitry may include a streaming network formed of streaming connections (shaded arrows), a memory mapped network formed of memory mapped connections (cross-hatched arrows).

Loading configuration data into control registers of DPEs 716 by way of the memory mapped connections allows each DPE 716 and the components therein to be controlled independently. DPEs 716 may be enabled/disabled on a per-DPE basis. Each core 718, for example, may be configured to access the memory modules 720 as described or only a subset thereof to achieve isolation of a core 718 or a plurality of cores 718 operating as a cluster. Each streaming connection may be configured to establish logical connections between only selected ones of DPEs 716 to achieve isolation of a DPE 716 or a plurality of DPEs 716 operating as a cluster. Because each core 718 may be loaded with program code specific to that core 718, each DPE 716 is capable of implementing one or more different kernels therein.

Cores 718 may be directly connected with adjacent cores 718 via core-to-core cascade connections. In one aspect, core-to-core cascade connections are unidirectional and direct connections between cores 718 as pictured. In another aspect, core-to-core cascade connections are bidirectional and direct connections between cores 718. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 716.

SoC interface block 722 operates as an interface that connects DPEs 716 to other resources of heterogeneous device 632. In the example of FIG. 9, SoC interface block 722 includes a plurality of interconnected tiles 724 organized in a row. In particular embodiments, different heterogeneous devices 632 may be used to implement tiles 724 within SoC interface block 722 where each different tile architecture supports communication with different resources of heterogeneous device 632. Tiles 724 are connected so that data may be propagated from one tile to another bi-directionally. Each tile 724 is capable of operating as an interface for the column of DPEs 716 directly above.

Tiles 724 are connected to adjacent tiles, to DPEs 716 immediately above, and to circuitry below using the streaming connections and the memory mapped connections as shown. Tiles 724 may also include a debug network that connects to the debug network implemented in DPE array 702. Each tile 724 is capable of receiving data from another source such as PS 706, PL 704, and/or another HCB 712. Tile 724-1, for example, is capable of providing those portions of the data, whether application or configuration, addressed to DPEs 716 in the column above to such DPEs 716 while sending data addressed to DPEs 716 in other columns on to other tiles 724, e.g., 724-2 or 724-3, so that such tiles 724 may route the data addressed to DPEs 716 in their respective columns accordingly.

In one aspect, SoC interface block 722 includes two different types of tiles 724. A first type of tile 724 has an architecture configured to serve as an interface only between DPEs 716 and PL 704. A second type of tile 724 is has an architecture configured to serve as an interface between DPEs 716 and NoC 708 and also between DPEs 716 and PL 704. SOC interface block 722 may include a combination of tiles of the first and second types or tiles of only the second type.

PL 704 is circuitry that can be programmed to perform specified functions. As an example, PL 704 may be implemented as field programmable gate array (FPGA) type of circuitry. PL 704 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 704 is highly configurable unlike hardwired circuitry. Each programmable circuit block of PL 704 typically includes a programmable element 726 (e.g., a functional element) and a programmable interconnect 742. The programmable interconnects 742 provide the highly configurable topology of PL 704. The programmable interconnects 742 may be configured on a per wire basis to provide connectivity among the programmable elements 726 of programmable circuit blocks of PL 704 and is configurable on a per-bit basis (e.g., where each wire conveys a single bit of information) unlike connectivity among DPEs 716, for example.

Examples of programmable circuit blocks of PL 704 include configurable logic blocks having look-up tables and registers. Unlike hardwired circuitry described below and sometimes referred to as hard blocks, these programmable circuit blocks have an undefined function at the time of manufacture. PL 704 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 704, are numerous and intermingled with the other programmable circuit blocks of PL 704. These circuit blocks may also have an architecture that generally includes a programmable interconnect 742 and a programmable element 726 and, as such, are part of the highly configurable topology of PL 704.

Prior to use, PL 704, e.g., the programmable interconnect and the programmable elements, must be programmed or "configured" by loading data referred to as a configuration bitstream into internal configuration memory cells therein. The configuration memory cells, once loaded with a configuration bitstream, define how PL 704 is configured, e.g., the topology, and operates (e.g., particular functions performed). Within this disclosure, a "configuration bitstream" is not equivalent to program code executable by a processor or computer.

PS 706 is implemented as hardwired circuitry that is fabricated as part of heterogeneous device 632. PS 706 may be implemented as, or include, any of a variety of different processor types each capable of executing program code. For example, PS 706 may be implemented as an individual processor, e.g., a single core capable of executing program code. In another example, PS 706 may be implemented as a multi-core processor. In still another example, PS 706 may include one or more cores, modules, co-processors, I/O interfaces, and/or other resources. PS 706 may be implemented using any of a variety of different types of architectures. Example architectures that may be used to implement PS 706 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. In one aspect, PS 706 may include one or more application processors and one or more real-time processors.

NoC 708 is a programmable interconnecting network for sharing data between endpoint circuits in heterogeneous device 632. The endpoint circuits can be disposed in DPE array 702, PL 704, PS 706, and/or selected HCBs 712. NoC 708 can include high-speed data paths with dedicated switching. In an example, NoC 708 includes one or more horizontal paths, one or more vertical paths, or both horizontal and vertical path(s). The arrangement and number of regions shown in FIG. 9 is merely an example. NoC 708 is an example of the common infrastructure that is available within heterogeneous device 632 to connect selected components and/or subsystems.

Within NoC 708, the nets that are to be routed through NoC 708 are unknown until a user application is created for implementation within heterogeneous device 632. NoC 708 may be programmed by loading configuration data into internal configuration registers that define how elements within NoC 708 such as switches and interfaces are configured and operate to pass data from switch to switch and among the NoC interfaces to connect the endpoint circuits. NoC 708 is fabricated as part of heterogeneous device 632 (e.g., is hardwired) and, while not physically modifiable, may be programmed to establish connectivity between different master circuits and different slave circuits of a user application. NoC 708, upon power-on, does not implement any data paths or routes therein. Once configured, e.g., by PMC 710, however, NoC 708 implements data paths or routes between endpoint circuits.

PMC 710 is responsible for managing heterogeneous device 632. PMC 710 is a subsystem within heterogeneous device 632 that is capable of managing the programmable circuit resources across the entirety of heterogeneous device 632. PMC 710 is capable of maintaining a safe and secure environment, booting heterogeneous device 632, and managing heterogeneous device 632 during operation. For example, PMC 710 is capable of providing unified and programmable control over power-up, boot/configuration, security, power management, safety monitoring, debugging, and/or error handling for the different programmable circuit resources of heterogeneous device 632 (e.g., DPE array 702, PL 704, PS 706, and NoC 708). PMC 710 operates as a dedicated platform manager that decouples PS 706 and from PL 704. As such, PS 706 and PL 704 may be managed, configured, and/or powered on and/or off independently of one another.

PMC 710 may be implemented as a processor with dedicated resources. PMC 710 may include multiple redundant processors. The processors of PMC 710 are capable of executing firmware. Use of firmware (e.g., executable program code) supports configurability and segmentation of global features of heterogeneous device 632 such as reset, clocking, and protection to provide flexibility in creating separate processing domains (which are distinct from "power domains" that may be subsystem-specific). Processing domains may involve a mixture or combination of one or more different programmable circuit resources of heterogeneous device 632 (e.g., wherein the processing domains may include different combinations or devices from DPE array 702, PS 706, PL 704, NoC 708, and/or other HCB(s) 712).

HCBs 712 include special-purpose circuit blocks fabricated as part of heterogeneous device 632. Though hardwired, HCBs 712 may be configured by loading configuration data into control registers to implement one or more different modes of operation. Examples of HCBs 712 may include input/output (I/O) blocks, transceivers for sending and receiving signals to circuits and/or systems external to heterogeneous device 632, memory controllers, or the like. Examples of different I/O blocks may include single-ended and pseudo differential I/Os. Examples of transceivers may include high-speed differentially clocked transceivers. Other examples of HCBs 712 include, but are not limited to, cryptographic engines, digital-to-analog converters (DACs), analog-to-digital converters (ADCs), and the like. In general, HCBs 712 are application-specific circuit blocks.

CFI 714 is an interface through which configuration data, e.g., a configuration bitstream, may be provided to PL 704 to implement different user-specified circuits and/or circuitry therein. CFI 714 is coupled to and accessible by PMC 710 to provide configuration data to PL 704. In some cases, PMC 710 is capable of first configuring PS 706 such that PS 706, once configured by PMC 710, may provide configuration data to PL 704 via CFI 714. In one aspect, CFI 714 has a built in cyclic redundancy checking (CRC) circuitry (e.g., CRC 32-bit circuitry) incorporated therein. As such, any data that is loaded into CFI 714 and/or read back via CFI 714 may be checked for integrity by checking the values of codes attached to the data.

The various programmable circuit resources illustrated in FIG. 9 can be programmed initially as part of a boot process for heterogeneous device 632. During runtime, the programmable circuit resources may be reconfigured. In one aspect, PMC 710 is capable of initially configuring DPE array 702, PL 704, PS 706, and NoC 708. At any point during runtime, PMC 710 may reconfigure all or a portion of heterogeneous device 632. In some cases, PS 706 may configure and/or reconfigure PL 704 and/or NoC 708 once initially configured by PMC 710.

In another aspect, a heterogeneous device includes dedicated on-chip circuitry that exposes I/O interfaces (e.g., AXI bus interfaces or other communication bus interfaces) to other portions of the heterogeneous device. For example, referring to the example of FIG. 9, heterogeneous device 632 may include dedicated on-chip circuitry that exposes AXI interfaces to DPE array 702, PL 704, NoC 708, DSP blocks in PL 704, HCBs 712, and/or other programmable I/O included in heterogeneous device 632.

FIG. 9 shows an exemplary heterogeneous device. In other examples, particular subsystems such as PS 706 may be omitted. For example, a heterogeneous device may include DPE array 702 in combination with PL 704. In another example, a heterogeneous device may include DPE array 702 in combination with NoC 708 and PL 704. One or more HCB(s) also may be included in the alternative examples described.

Some implementations are directed to a computer program product (e.g., nonvolatile memory device), which includes a machine or computer-readable medium having stored thereon instructions which may be executed by a computer (or other electronic device) to perform these operations/activities.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for pruning neural networks. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:

selecting by a design tool, for a layer of a plurality of layers of a neural network, NN, model, a current dt-ds pair from a plurality of different dt-ds pairs supported by a target device, wherein each dt-ds pair specifies a data type, dt, and an associated circuit structure, ds, that is configurable to compute dx s operations in parallel on a set of input activations and a matrix of weights of the data type, d is a number of rows in a sub-matrix of the matrix of weights, s is a number of columns in the sub-matrix, and dxs≥1;

selecting, as pruned weights of the layer by the design tool, one or more subsets of the weights including a first number of subsets of the weights based at least on each subset of the one or more subsets including dxs weights in the matrix of weights of the layer;

evaluating performance, by the design tool, of a pruned version of the NN model based on the data type of the current dt-ds pair of the layer and a pruned weight matrix that is the matrix of weights of the layer pruned according to the pruned weights of the layer;

compiling, in response to the performance satisfying a threshold, the pruned version of the NN model by the design tool into an execution graph and configuration data for implementing, on the target device, the circuit structure of the current dt-ds pair of the layer; and selecting, based on a failure to schedule the execution graph, a second number of subsets of the weights, wherein the second number differs from the first number.

2. The method of claim 1, further comprising, selecting another dt-ds pair from the plurality of different dt-ds pairs as the current dt-ds pair in response to the performance not satisfying the threshold, and repeating the selecting of the pruned weights, and evaluating the performance.

3. The method of claim 1, wherein the performance indicates a throughput level, and the method further comprising, selecting, in response to the throughput level not satisfying the threshold, a third number of subsets of the weights, wherein the third number is greater than the first number, and repeating evaluating the performance.

4. The method of claim 1, wherein the performance indicates an accuracy level, and the method further comprising, selecting, in response to the accuracy level not satisfying the threshold, a third number of subsets of the weights, wherein the third number is less than the first number, and repeating evaluating the performance.

5. The method of claim 1, wherein selecting the one or more subsets of the weights as pruned weights includes selecting a plurality of subsets of the weights that eliminate one or more input activations of the set of input activations from the NN model.

6. The method of claim 1, further comprising, in response to the performance not satisfying the threshold:
   selecting a first dt-ds pair and a second dt-ds pair from the plurality of different dt-ds pairs;
   selecting as the pruned weights of the layer, one or more subsets of dxs weights according to the first dt-ds pair and one or more subsets of dxs weights according to the second dt-ds pair; and
   evaluating performance of a pruned version the NN model based on the data types of the first dt-ds pair and the second dt-ds pair and a pruned weight matrix that is the matrix of weights of the layer pruned according to the pruned weights of the layer.

7. The method of claim 1, wherein each dt-ds pair corresponds to a pruning granularity and the current dt-ds pair corresponds to a first pruning granularity, and the method further comprising:
   selecting from the plurality of dt-ds pairs for the layer, in response to compiler output indicating a failure to schedule the execution graph, a dt-ds pair that corresponds to a second pruning granularity finer than the first pruning granularity; and
   repeating the selecting of the pruned weights, evaluating performance, and compiling.

8. The method of claim 1,
   wherein the second number is greater than the first number, and the method further comprising:
   repeating evaluating the performance and compiling.

9. The method of claim 1, wherein each dt-ds pair corresponds to a pruning granularity and the current dt-ds pair corresponds to a first pruning granularity, and the method further comprising:
   selecting from the plurality of dt-ds pairs for the layer, in response to compiler output indicating a number of processor loads and stores exceeds a threshold, a dt-ds pair that corresponds to a second pruning granularity coarser than the first pruning granularity; and
   repeating the selecting of the pruned weights, evaluating performance, and compiling.

10. The method of claim 1, wherein each dt-ds pair corresponds to a pruning granularity and the current dt-ds pair corresponds to a first pruning granularity, and the method further comprising:
   selecting from the plurality of dt-ds pairs for the layer, in response to compiler output indicating a number of cache loads and stores exceeds a threshold, a dt-ds pair that corresponds to a second pruning granularity coarser than the first pruning granularity; and
   repeating the selecting of the pruned weights, evaluating performance, and compiling.

11. The method of claim 1, wherein each dt-ds pair corresponds to a pruning granularity and the current dt-ds pair corresponds to a first pruning granularity and the configuration data includes executable program code, and the method further comprising:
   selecting from the plurality of dt-ds pairs for the layer, in response to a size of the program code exceeding a threshold, a dt-ds pair that corresponds to a second pruning granularity coarser than the first pruning granularity; and
   repeating the selecting of the pruned weights, evaluating performance, and compiling.

12. The method of claim 1, wherein each dt-ds pair corresponds to a pruning granularity and the current dt-ds pair corresponds to a first pruning granularity and the configuration data includes data to configure programmable logic, and the method further comprising:
   selecting from the plurality of dt-ds pairs for the layer, in response to compiler output indicating the data to configure programmable logic has a size that exceeds a threshold, a dt-ds pair that corresponds to a second pruning granularity coarser than the first pruning granularity; and
   repeating the selecting of the pruned weights, evaluating performance, and compiling.

13. The method of claim 1, wherein each dt-ds pair corresponds to a pruning granularity, the current dt-ds pair corresponds to a first pruning granularity, and the performance indicates an accuracy level and a throughput level, and the method further comprising:
   selecting from the plurality of dt-ds pairs for the layer, in response to the accuracy level not satisfying a first threshold and the throughput level satisfying a second threshold, a dt-ds pair that corresponds to a second pruning granularity finer than the first pruning granularity; and
   repeating the selecting of the pruned weights, evaluating performance, and compiling.

14. The method of claim 1, wherein each dt-ds pair corresponds to a pruning granularity, the current dt-ds pair corresponds to a first pruning granularity, and the performance indicates an accuracy level and a throughput level, and the method further comprising:
   selecting from the plurality of dt-ds pairs for the layer, in response to the accuracy level satisfying a first threshold and the throughput level not satisfying a second threshold, a dt-ds pair that corresponds to a second pruning granularity coarser than the first pruning granularity; and
   repeating the selecting of the pruned weights, evaluating performance, and compiling.

15. The method of claim 1, wherein each dt-ds pair corresponds to a pruning granularity, the current dt-ds pair corresponds to a first pruning granularity and has a dt providing a first level of accuracy, and the performance indicates an accuracy level and a throughput level, and the method further comprising, in response to the accuracy level not satisfying a first threshold and the throughput level not satisfying a second threshold:
   selecting one or more of a dt-ds pair that corresponds to a second pruning granularity that is not equal to the first pruning granularity, a third number of subsets of the weights, wherein the third number is not equal to the first number, or a dt-ds pair having a dt providing a second level of accuracy that is not equal to the first level of accuracy; and
   repeating the selecting of the pruned weights, evaluating performance, and compiling.

16. The method of claim 1, wherein the operations include multiply-and-accumulate operations.

17. A system comprising:

an arrangement of one or more processors;

a computer storage arrangement coupled to the one or more processors and configured with program code that when executed by the one or more processors causes the one or more processors to perform operations including:

selecting for a layer of a plurality of layers of a neural network, NN, model, a current dt-ds pair from a plurality of different dt-ds pairs supported by a target device, wherein each dt-ds pair specifies a data type, dt, and an associated circuit structure, ds, that is configurable to compute d×s operations in parallel on a set of input activations and a matrix of weights of the data type, d is a number of rows in a sub-matrix of the matrix of weights, s is a number of columns in the sub-matrix, and d×s≥1;

selecting, as pruned weights of the layer, one or more subsets of the weights including a first number of subsets of the weights based at least on each subset of the one or more subsets including d×s weights in the matrix of weights of the layer;

evaluating performance of a pruned version the NN model based on the data type of the current dt-ds pair of the layer and a pruned weight matrix that is the matrix of weights of the layer pruned according to the pruned weights of the layer;

compiling, in response to the performance satisfying a threshold, the pruned version of the NN model into an execution graph and configuration data for implementing, on the target device, the circuit structure of the current dt-ds pair of the layer;

selecting, based on a failure to schedule the execution graph, a second number of subsets of the weights, wherein the second number differs from the first number.

18. The system of claim 17, wherein the program code when executed by the one or more processors causes the one or more processors to perform operations including, selecting another dt-ds pair from the plurality of different dt-ds pairs as the current dt-ds pair in response to the performance not satisfying the threshold, and repeating the selecting of the pruned weights, and evaluating the performance.

19. The system of claim 17, wherein each dt-ds pair corresponds to a pruning granularity and the current dt-ds pair corresponds to a first pruning granularity, the second number is greater than the first number, and the program code when executed by the one or more processors causes the one or more processors to perform operations including, in response to compiler output indicating a failure to schedule the execution graph:

repeating evaluating the performance, and compiling.

20. The system of claim 17, wherein the program code when executed by the one or more processors causes the one or more processors to perform operations including, in response to the performance not satisfying the threshold:

selecting a first dt-ds pair and a second dt-ds pair from the plurality of different dt-ds pairs;

selecting as the pruned weights of the layer, one or more subsets of d×s weights according to the first dt-ds pair and one or more subsets of d×s weights according to the second dt-ds pair; and evaluating performance of a pruned version the NN model based on the data types of the first dt-ds pair and the second dt-ds pair and a pruned weight matrix that is the matrix of weights of the layer pruned according to the pruned weights of the layer.

* * * * *